United States Patent [19]

Duphily

[11] Patent Number: 5,407,385
[45] Date of Patent: Apr. 18, 1995

[54] STEERED AND DRIVEN UNIVERSAL JOINT

[76] Inventor: Darryl D. Duphily, R.D. 4, Box 138, Dover, Del. 19901

[21] Appl. No.: 70,257

[22] Filed: Jun. 2, 1993

[51] Int. Cl.6 .............................................. F16D 3/16
[52] U.S. Cl. .................................... 464/151; 464/147; 464/904
[58] Field of Search ............... 464/151, 150, 152, 147, 464/106, 906, 904; 403/76, 80, 82, 58, 57, 53, 127; 180/223

[56] References Cited

U.S. PATENT DOCUMENTS

| 397,976 | 2/1889 | Doan . | |
|---|---|---|---|
| 1,188,854 | 6/1916 | Spacie . | |
| 1,225,174 | 5/1917 | Ream | 464/150 |
| 1,297,968 | 3/1919 | Ream . | |
| 1,826,662 | 10/1931 | Harel | 464/150 |
| 2,207,980 | 7/1940 | Greiner . | |
| 3,525,543 | 8/1970 | Oppenheimer | 403/57 |
| 3,587,249 | 6/1971 | Arnold | 464/151 |
| 3,903,711 | 9/1975 | Stage | 464/106 |
| 5,042,608 | 8/1991 | Horiike et al. . | |
| 5,236,289 | 8/1993 | Salyer | 403/57 |
| 5,277,659 | 1/1994 | Cornay | 464/147 |

FOREIGN PATENT DOCUMENTS 1231674 5/1971 United Kingdom .

Primary Examiner—Daniel P. Stodola
Assistant Examiner—Eileen A. Dunn
Attorney, Agent, or Firm—Richard C. Litman

[57] ABSTRACT

A constant velocity universals joint accepts rotary input through its axle and is also steered by a thrust bearing. A ball member having outward projections passes rotary motion to a surrounding socket member having cooperating inward projections which slidingly engage the ball projections. Both types of projections rotate about respective mountings. As the socket member turns in response to a steering input and the ball member maintains its orientation, the respective cooperating projections rotate about their mountings and slide across one another. The ball member thus continues to propel the socket member while accommodating variable angularity therebetween.

2 Claims, 3 Drawing Sheets

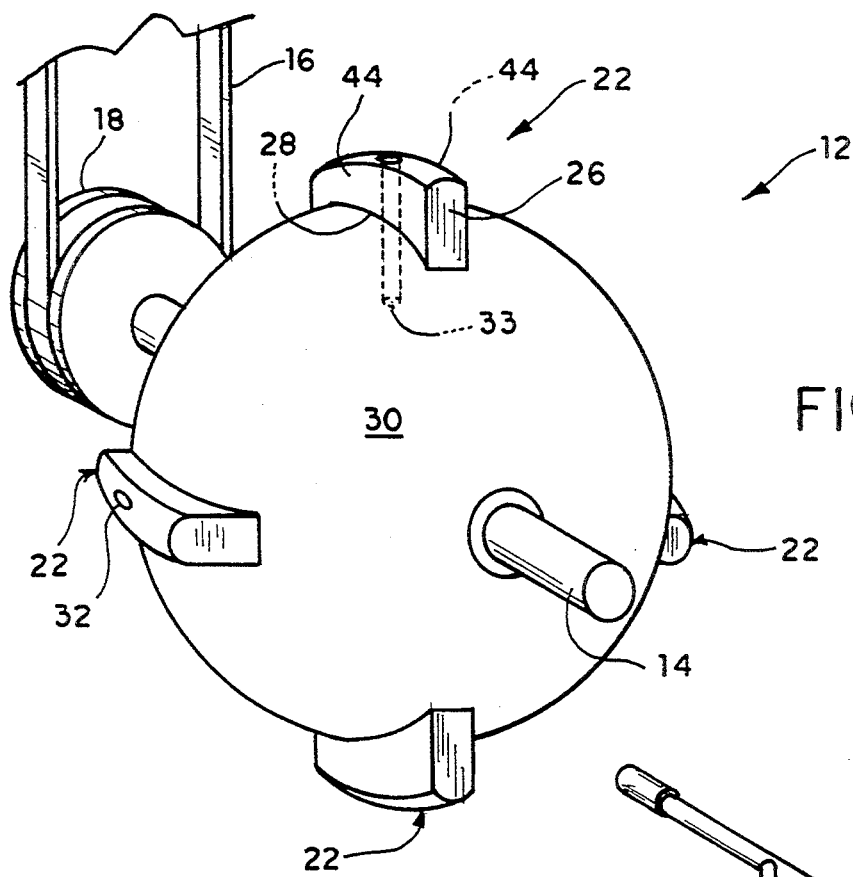
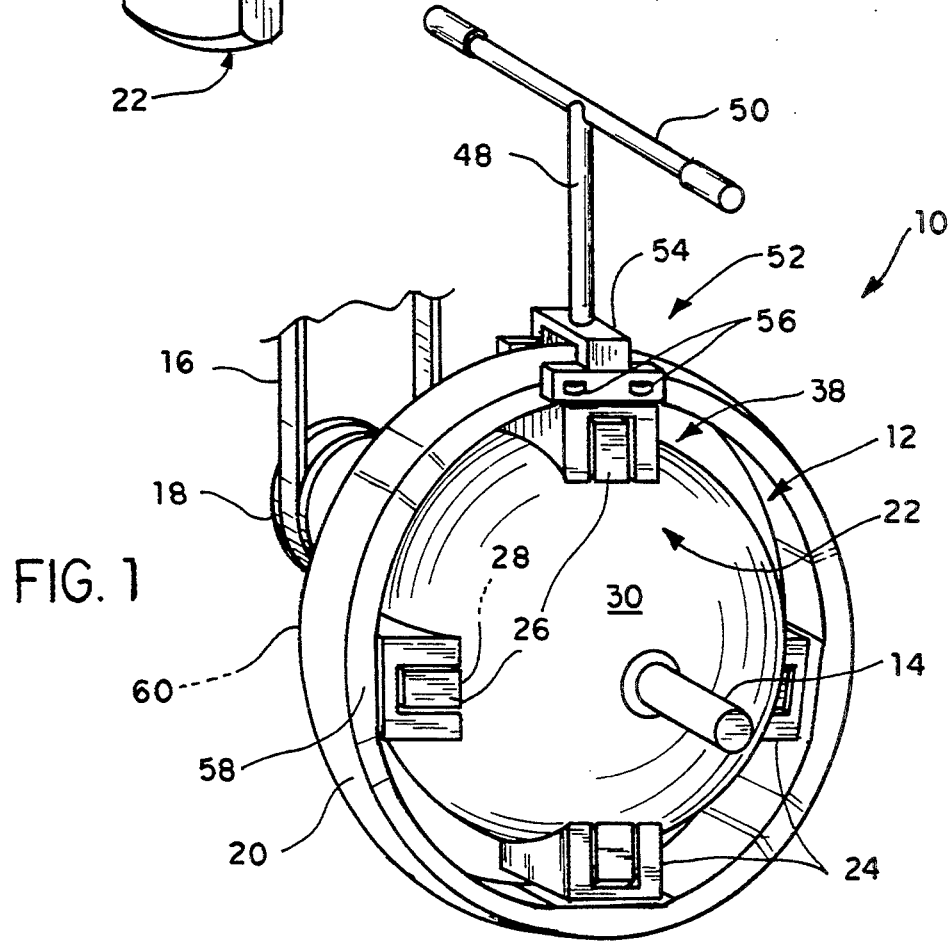

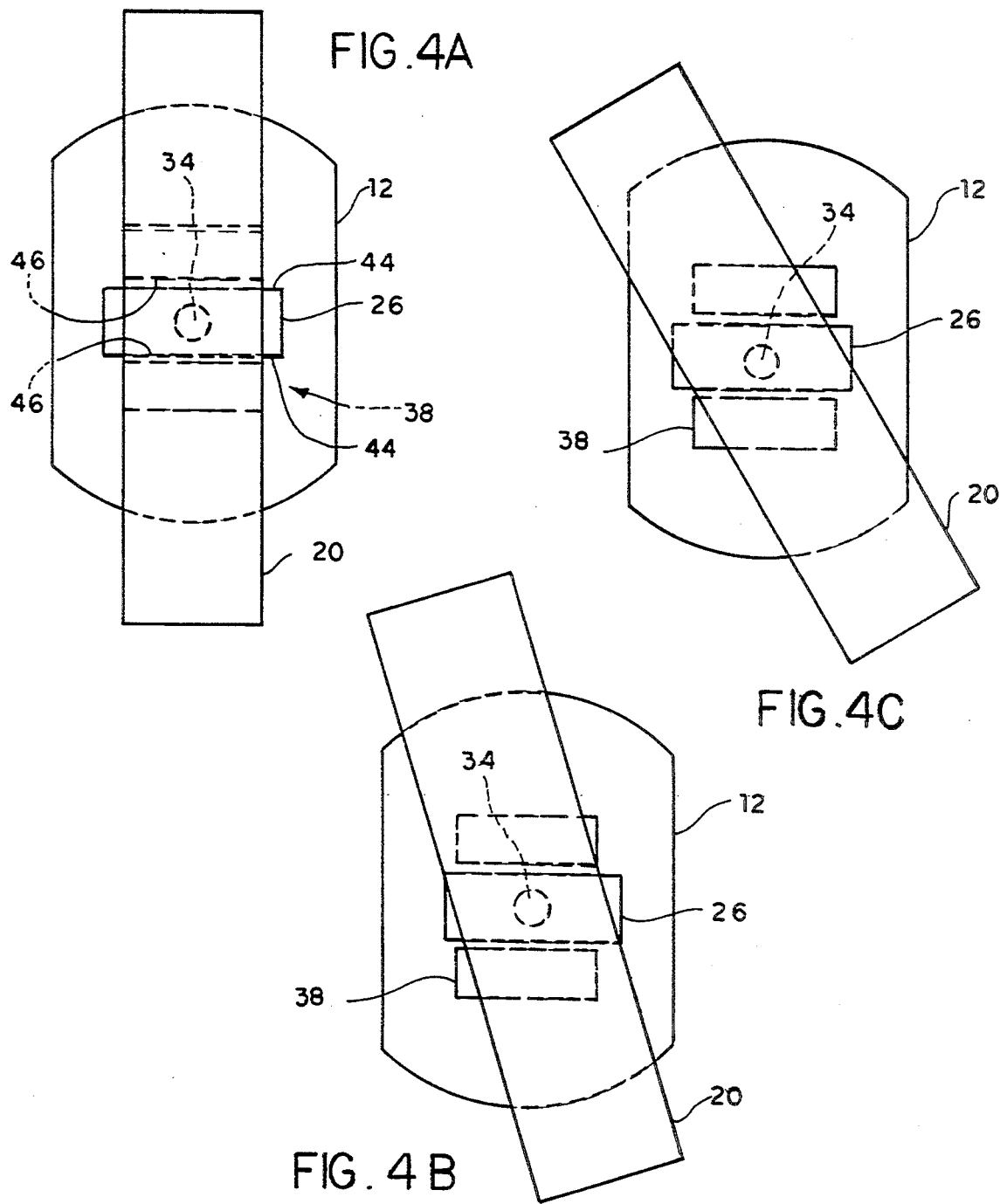

STEERED AND DRIVEN UNIVERSAL JOINT

BACKGROUND OF THE INVENTION

1. Field of the Invention

The present invention relates to constant velocity (CV) type universal joints, and more particularly, to a CV joint which accepts a rotary input and a separate steering input.

2. Description of the Prior Art

Universal joints designed to accept a steering input have been proposed in, among other sources, U.S. Pat. No. 1,188,854, issued to Thomas Spacie on Jun. 27, 1916, and U.K. Pat. Application No. 1,231,674, published on May 12, 1971. Both inventions disclose a joint having a substantially spherical inner member surrounded by a socket member. The sphere has projections configured to cooperate with the socket while accommodating relative motion therebetween.

CV type universal joints are exemplified by U.S. Pat. Nos. 397,976, issued to Riley R. Doan on Feb. 19, 1889; U.S. Pat. No. 1,297,968, issued to Fred H. Ream on Mar. 18, 1919; and U.S. Pat. No. 2,207,980, issued to Anton F. Greiner on Jul. 16, 1940. These patents disclose, generally, ball and socket construction, the ball having projections to engage the socket member while accommodating relative motion therebetween.

U.S. Pat. No. 5,042,608, issued to Satoru Hotlike et al. on Aug. 27, 1991, discloses a preferred application of the present invention, although not the structure.

None of the above inventions and patents, taken either singly or in combination, is seen to describe the instant invention as claimed.

SUMMARY OF THE INVENTION

A constant velocity (CV) universal joint has an inner ball member which is fixed to a rotating axle, the axle being rotated by connection to a power source. An outer socket member, limited in configuration so as to resemble a ring, but functionally providing a socket, is in turn rotated by engagement with the ball. The ball has outward projections pivotally mounted thereon at intervals along a circumference thereof. The socket member has corresponding inward projections, also pivotally mounted, the ball projections engaging the socket projection in spline-and-groove manner. As a steering input is applied, and the socket member assumes angularity with respect to the ball, operative engagement of the respective projections is maintained and accommodated by pivot and by sliding engagement between the respective projections.

The socket member is at least partially supported by the ball, the socket inward projections having surfaces configured to cooperate with and to contact the ball surface.

Steering input is provided by a thrust bearing which straddles the ring-like socket member in the manner of a disc brake caliper straddling a brake disc.

Preferably applied to a front wheel drive motorcycle, the wheel turns when a belt or chain drives the axle, and is steered when a steering shaft acts on the thrust bearing.

Accordingly, it is a principal object of the invention to provide a ball and socket type CV universal joint which is separately rotated and steered.

It is another object of the invention to provide ball projections and cooperating socket projections which are readily installed respectively in the ball and socket members.

It is a further object of the invention to provide a CV universal joint which receives a steering input at a point distant from its axis of rotation.

Still another object of the invention is to provide a ball and socket type of CV universal joint wherein the socket member is at least partially supported on the ball member, and wherein the ball member is supported on an axle member coaxial with the ball axis of rotation.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a perspective view of the invention.

FIG. 3 is a perspective detail view of the universal joint inner member.

FIGS. 4A, 4B, and 4C are diagrammatic views showing interrelationship of the inner and outer members at three progressive stages of steering angularity.

Similar reference characters denote corresponding features consistently throughout the attached drawings.

DETAILED DESCRIPTION OF THE PREFERRED EMBODIMENT

Figure 2:
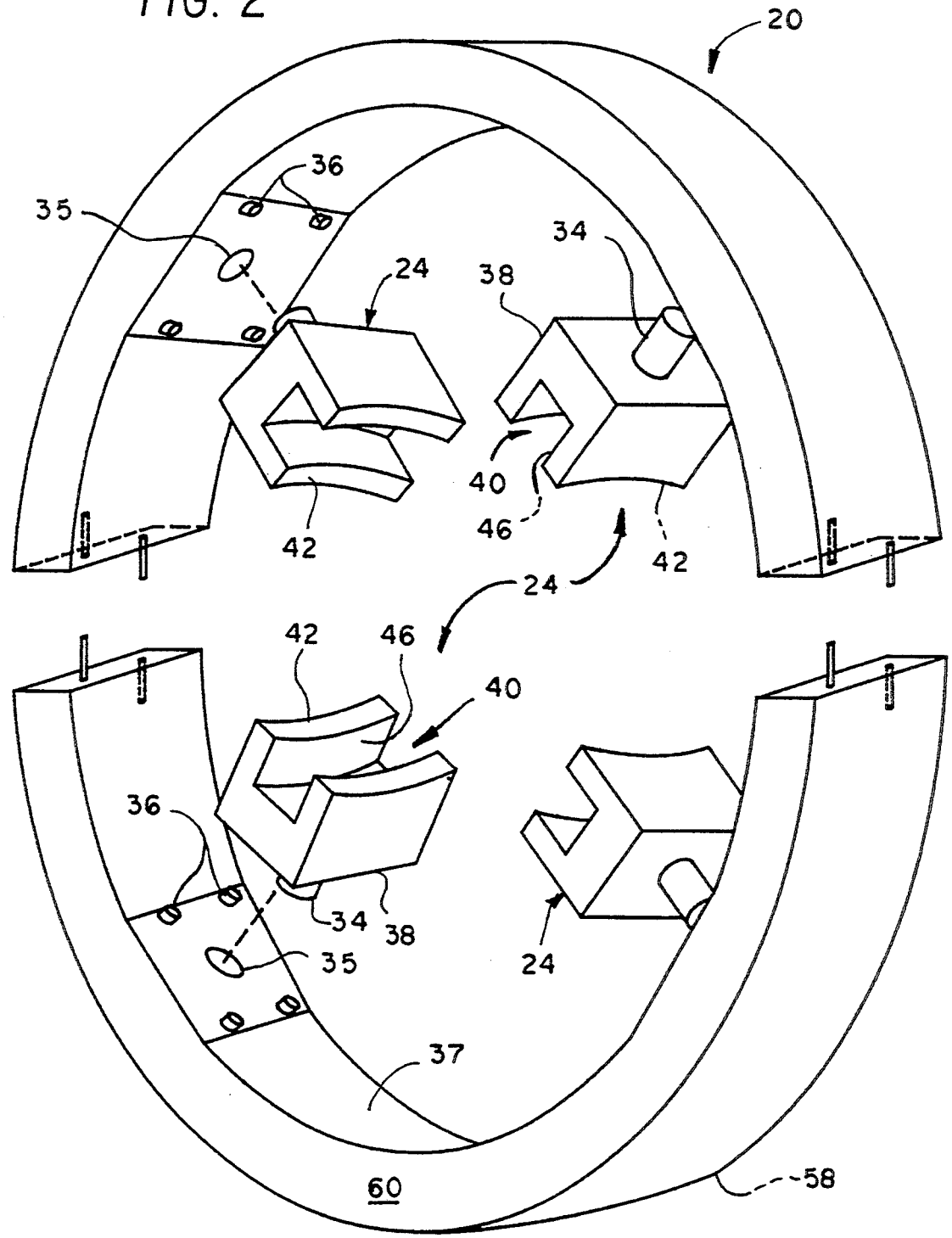
FIG. 2 is an exploded perspective detail view of the universal joint outer member, drawn to an enlarged scale.

The present invention provides a constant velocity (CV) universal joint 10 which accepts both rotational input and, separately, a steering input. As seen in FIG. 1, CV universal joint 10 has an inner ball member 12 which is fixed to an axle 14, the axle 14 being rotatably driven. Although connection to a belt 16 and pulley 18 is shown, a rotating shaft geared to the axle (not shown), or still other means could be employed to turn axle 14.

An outer socket member 20, limited in its configuration so as more to resemble a ring, but functionally providing a socket in that ball member 12 is constantly constrained to remain within socket member 20, is in turn rotated by engagement with ball member 12. Better seen in FIG. 3, the ball member 12 has outward projections or ball member projections 22 pivotally mounted thereon at intervals along a circumference thereof. Referring to FIG. 2, the socket member 20 has corresponding inward projections or socket member projection 24, also pivotally mounted, the ball member projections 22 engaging the socket member projections 24 in spline-and-groove manner. Engagement is best seen in FIG. 1.

Referring again to FIG. 3, each ball member projection 22 is pivotally mounted on a shaft or first stem 32 journaled in a bore 33 in the exterior surface 30 of the ball member 12. The ball member projection 22 includes a plate 26 disposed parallel to a longitudinal axis of the shaft 32. The ball member projection 22 also includes a curved lower surface 28 substantially conforming to the ball member exterior surface 30.

Turning again to FIG. 2, it will be seen that each socket member projection 24 has a shaft or second stem 34 attached to a shoe 38. The shaft 34 is journaled in a second bore 35 disposed in an inner surface 37 of the socket member 20, thereby enabling the socket member projection 24 to pivot. Total pivot is controlled by stops 36. The shoe 38 includes a groove 40 therein and innermost surfaces 42. The innermost surfaces 42 conform to the ball member exterior surface 30.

The socket member 20 is assembled over the ball member 12, as shown in FIG. 1. Each shoe groove 40 surrounds a corresponding ball member projection plate 26. Shoe 38 and plate 26 pivot in tandem, whereby a plate driving face 44 maintains parallel orientation to an associated driven face 46 of shoe 38. Therefore, it follows that ball member 12 continues to drive socket member 20, even when angularity is introduced therebetween.

Angularity is introduced when a steering input turns socket member 20. Steering shaft 48, shown representatively with a steering bar 50, rotates a thrust bearing assembly 52. Thrust bearing assembly 52 comprises a frame 54 and rotating bearings 56, and straddles the ring-like socket member 20 in the manner of a disc brake caliper straddling a brake disc. Thrust bearing assembly 52 contacts socket member 20 at first and second external faces 58,60, forcing socket member 20 to rotate about an axis described by steering shaft 48.

The socket member 20 is at least partially supported by the ball member 12, since the shoe surfaces 42 constantly contact the ball member surface 30.

As a steering input is applied, and the socket member 20 assumes angularity with respect to the ball member 12, operative engagement of the respective projections 22,24 is maintained and accommodated by pivot and by sliding engagement therebetween. This is best shown in progressive steps in FIGS. 4A, 48, and 4C.

In FIG. 4A, both ball and socket members 12,20 are aligned, no steering yet being attempted. As a steering input turns socket member 20, the ball member 12 being shown in a constant orientation to facilitate reference, pivot of shoe 38 maintains parallel relation of driving and driven faces 44,46. It will be understood that although the shoe 38 and plate 26 are shown at a constant location, they actually revolve about the axle axis as their respective socket and ball members 20,12 also revolve. Nonetheless, the operative relationship between shoe 38 and plate 26 shown in FIGS. 4A, 4B, and 4C exists at any degree of revolution.

When a steering input turns socket member 20, as seen in FIG. 4B, shoe 38 pivots with respect to socket member 20, and plate 26, which drives shoe 38, remains aligned with ball member 12.

In practice, since shoe 38 and plate 26 are both pivotally mounted, both may pivot, aligning to define an intermediate angle (not shown) between their respective socket and ball members 20 and 12, driving and driven faces 44,46 continuing to remain parallel. In this case, both shoe 38 and plate 26 would each take up complementary portions of the total angularity.

Even as greater angularity is achieved, as progressively illustrated in FIGS. 4B and 4C, the operative relationship remains. These relationships will continue until maximum angularity, as limited by stops 36 (see FIG. 2), is reached, as seen in FIG. 4C.

A preferable application of the present invention 10 is to enable construction of a front wheel drive motorcycle (not shown). Socket member 20 provides a front wheel, which, with a conventional pneumatic tire, propels the motorcycle along a road. Belt 16, or a suitable chain or driveshaft (latter two not shown), is connected to a transmission output shaft (not shown), and drives the front wheel. Steering is provided by a conventional steering bar, and is transmitted by shaft 48 to thrust bearing assembly 52.

It is to be understood that the present invention is not limited to the sole embodiment described above, but encompasses any and all embodiments within the scope of the following claims.

I claim:

1. A constant velocity universal joint, accepting rotational driving input and, separately, a steering input, and providing a steered and rotatingly driven output, said universal joint comprising:

an inner ball member and an axle, said ball member being fixed to said axle such that upon rotation of said axle, both said axle and said ball member rotate about a common axis in unison, said ball member having a circumference normal to said common axis, said ball member further comprising a plurality of first bores therein, said plurality of first bores being located at intervals along said circumference, and outwardly oriented ball member projections, each of said ball member projections having a cylindrical first stem and a plate, said first stem journaled in one of said plurality of first bores, said first stem defining a longitudinal axis, and said plate disposed parallel to said longitudinal axis of said first stem, an outer, ring-like socket member partially surrounding said ball member, said socket member having an axis of rotation, first and second lateral faces, an inner surface having a plurality of second bores located therein and further being located to correspond to said plurality of first bores, there being one of said plurality of first bores for each of said plurality of second bores, said socket member also comprising a plurality of inwardly oriented socket member projections each having a cylindrical second stem attached to a shoe, said second stem journaled within one of said plurality of second bores, said shoe having a groove, whereby each of said plurality of socket member projections is assembled over a corresponding one of said ball member projections, said shoe partially surrounding said corresponding one of said ball member projections, said corresponding one of said ball member projections slidingly engaging said groove, and said ball member and socket member projections rotating respectively about said first and second stems within said plurality of first and second bores, said corresponding one of said ball member projections being enabled to pass a rotational input to its associated one of said plurality of socket member projections, while accommodating angularity therebetween, and means for transmitting a steering input to said socket member, said means including a thrust bearing straddling said socket member and contacting said first and second lateral faces of said socket member.

2. The constant velocity universal joint according to claim 1, wherein, said shoe of said each of said plurality of socket member projections includes a radially innermost end defining a bearing surface therealong, said bearing surface being configured to cooperate with and to contact said ball member, whereby said socket member is at least partially supported on said shoe.

* * * * *